Patented Jan. 6, 1953

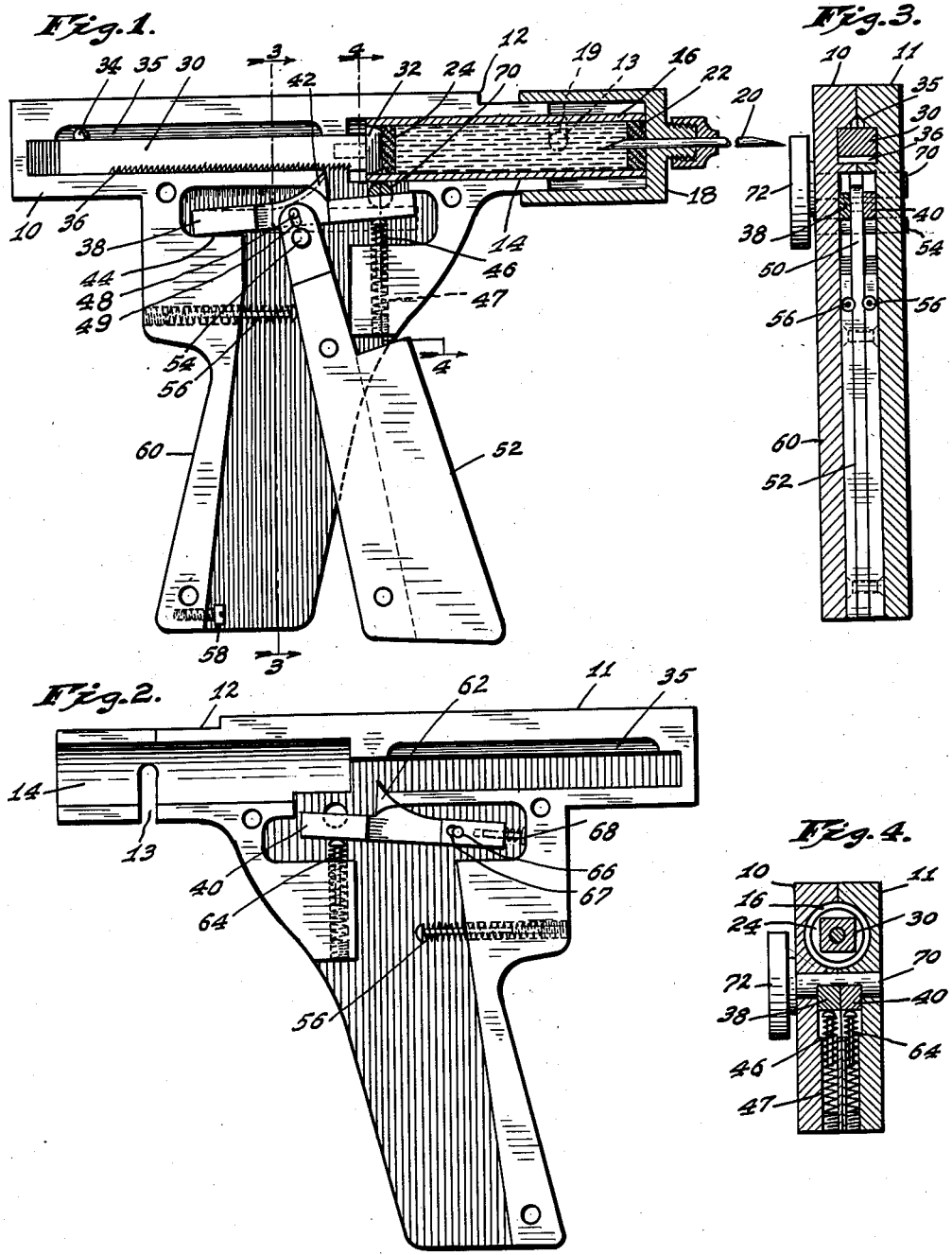

2,624,338

UNITED STATES PATENT OFFICE 2,624,338

DISPENSING GUN

Frank C. Moore, Louisville, Ky., and William Earl Mattox, Indianapolis, Ind.

Application October 31, 1950, Serial No. 193,194

10 Claims. (Cl. 128—218)

This invention relates to a dispensing gun for dispensing the contents of a cartridge in uniform predetermined quantities. It is especially adapted for dispensing an extrudable semi-solid composition, and is particularly suitable for the extrusion injection of semi-solid compositions for veterinary administration, for example for "caponizing" fowl.

The gun is especially adapted for handling the composition of our co-pending application Serial No. 193,195, filed October 31, 1950, and for carrying out the method of that application.

In the care and raising of domestic animals—cattle, hogs, fowl, etc.—it is frequently desirable to administer medicaments to large numbers of such animals. Such occasions arise not only with the administration of curative medicaments, but also with preventive medicaments, and epecially with the administration of medicaments affecting the animal's growth or development, or the character or flavor of its meat. For example, chickens may be "caponized" by administration, usually subcutaneously, of estrogenic medicaments, and the economic practicability of such caponizing depends on the rapidity and efficiency with which such medicaments can be administered to flocks of large number of chickens. We use the term "caponizing" to refer to the de-sexing, usually temporary de-sexing, of fowl of both sexes, to control their growth and devolopment.

It is a primary object of our invention to provide a dispensing gun suitable for the extrusion injection of measured quantities of a medicament-containing composition in semi-solid state, for the administration of medicament to animals in large numbers, rapidly, safely, and with a minimum of trouble and with a minimum of disturbance to the animals and their development and without waste of the medicament composition. It is an object of our invention to provide a manually operated gun for the accurate dispensing of predetermined quantities of the contents of a multiple-shot cartridge, in which the dispensing pressure on the cartridge is relieved at the end of each operation, to prevent undesired oozing or bleeding of the contents of the cartridge from the gun. It is an object of our invention to provide a gun of this type adapted to receive a replaceable cartridge containing a multiple-shot quantity of the material to be dispensed, and in which the cartridges are readily and quickly replaceable. It is an object of our invention to provide such a gun which is adapted for the dispensing of measured quantities of a semi-solid composition, for example a composition which is normally self-supporting and non-flowing but which may be extruded through a small tube by plastic flow, although our gun is not limited to use with such a semi-solid composition and is also adaptable for use with liquid and semi-liquid materials.

In accordance with our invention we provide a gun-shaped body having a barrel adapted to receive a cylindrical cartridge and closed at its forward end by a readily removable and replaceable cap. We provide the cap with a dispensing tube or needle, the rear end of which is adapted to penetrate the stopper at the forward end of the cylindrical cartridge. Behind the cartridge we provide a plunger having a piston-like head adapted to be advanced through the cartridge to expel its contents, and we advance the plunger by a pawl actuated by a lever-trigger having a high mechanical advantage. We retain the plunger in advanced position by a holding pawl having limited lost-motion retraction movement, which may be yieldingly opposed, so that the holding pawl may retract to relieve the dispensing pressure created by the driving pawl.

The accompanying drawing illustrates our invention. In such drawing, Fig. 1 is a longitudinal section of a gun embodying our invention and showing the trigger-actuated rack pawl; Fig. 2 is a longitudinal section taken in the opposite direction from that of Fig. 1 and showing the rack holding pawl; Fig. 3 is a transverse section of the device of Fig. 1, taken on the line 3—3 of Fig. 1; and Fig. 4 is a transverse section taken on the line 4—4 of Fig. 1.

The injection gun shown in the drawing is conveniently made of two casing parts separable in a longitudinal plane, the left-hand part 10 being shown in Fig. 1 and the right-hand part 11 being shown in Fig. 2. The two parts 10 and 11 are complementary, and when assembled form the body of the gun. The front of such body is in the form of a barrel 12 having a cylindrical chamber 14 adapted to receive a cylindrical cartridge 16. The front of the barrel is closed by a cap 18, which is removably locked in place by a bayonet lock comprising two pins 19 carried by the cap 18 which take into L-shaped slots 13 in the barrel 12. The cap 18 has a forwardly extending, bored boss, which removably carries a dispensing tube, such as a double-ended extrusion-injection needle 20, which may for example correspond to a 16-gauge hypodermic needle, the rear end of which projects into the cartridge-chamber 14. The skirt of the cap 18 telescopically engages the barrel 12 and is substantially longer than the inner end of the needle 20, to aline the parts prior to entrance of such needle 20 into the cartridge chamber 14. The cartridge 16 comprises a cylindrical barrel closed at its forward end by a rubber or rubber-like stopper 22 adapted to be penetrated by the rear end of the needle 20 when the cap 18 is placed upon the barrel 12. The rear end of the cartridge 16 is closed by a rubber or rubber-like stopper 24 adapted to be advanced in the cartridge to expel its contents through the needle 20. The cartridge may be made of any suitable material, for example, glass, or preferably metal. It should be of substantially uniform internal cross-section, and of sufficient strength to withstand the pressure used for extrusion of its contents.

Behind the cartridge 16, the casing is formed to provide a guiding chamber for a plunger 30. Conveniently, the plunger 30 is of rectangular cross section, with a diagonal dimension somewhat less than the internal diameter of the cartridge 16, and its forward end is provided with a head 32 of circular cross section adapted to have a free sliding fit in the bore of the cartridge 16. The upper surface of the plunger 30 may carry a stop-pin 34 riding in a slot 35 in the casing 10—11 to limit plunger movement.

The lower surface of the plunger 30 is formed as a rack 36 whose teeth are uniformly spaced a distance equivalent to the movement desired for the extrusion of a single shot from the cartridge 16. The rack-tooth spacing and the internal diameter of the cartridge 16 are related to give the desired volume of composition per shot, and the relative concentrations of ingredients in the composition may be adjusted to give the desired quantities of any one or more of them. In the device shown, we have found it convenient to use a rack-tooth spacing of fifty thousandths of an inch and for the cartridge have used standard "Pyrex" glass tubing of 17 mm. O. D. size. We have used such cartridges in a length to contain 10 cc. of medicament composition and extrude 0.2 cc. of medicament composition per shot. In caponizing chickens, for example, with such arrangement, we have used the compositions of the examples in our copending application Serial No. 193,195, containing 75 mg. of diethylstilbestrol per cc., to administer 15 mg. of diethylstilbestrol in each 0.2 cc. shot. Such compositions contain a water-soluble wax-like carrier, and are normally of solid or semi-solid consistency, capable of plastic flow under elevated pressure.

The rack 36 is engaged by two pawls 38 and 40, lying side by side in a compartment formed immediately below the rack 36. The pawl 38 is in the form of a straight bar having an upstanding tooth 42. Its rear end rides on the lower surface 44 of the pawl-containing compartment, and its forward end is yieldingly urged upward by a spring pressed plunger 46 mounted in a vertical bore 47 in the casing part 10. Such pawl 38 carries a pin 48 which is received in a slot 49 in the lever arm 50 of the trigger 52. The trigger 52 is pivotally mounted on a pin 54 carried by the casing parts 10 and 11. The lever arm 50 above such pivot 54 is relatively short with respect to the lower arm of the trigger 52, to provide a high mechanical advantage. With a semi-solid composition, this may be of the order of 12 to 1, so that with a workable hand pressure of say 10 lbs. on the trigger the leverage produces a pressure on the contents of the cartridge of the order of 400 lbs. per square inch for extrusion. The handle of the trigger 52 is yieldingly urged forward by a pair of spring-pressed plungers 56 mounted in bores in the handle portion 60 of the gun. Rearward movement of the handle 52 may be limited by an adjustable stop screw 58.

The holding pawl 40 is similar in shape to the trigger-actuated pawl 38, and is similarly provided with an upstanding ratchet tooth 62 to engage the rack 36. Its front end is yieldingly urged upward by a spring-pressed plunger 64, and its rear end is positioned by a cross pin 66 carried by the casing and passing through a slot 67 in the pawl. Such slot is of limited elongation, to permit and limit longitudinal lost-motion movement of the pawl 40. A spring-pressed plunger 68 at the rear of the pawl 40 yieldingly urges it forward to the limit of its permitted movement.

Overlying the forward ends of the pawls 38 and 40 there is a transverse pin 70, half cut away where it crosses the pawls, to form a pawl retracting cam. A handle 72 on the end of such cam pin 70 permits it to be rotated to depress the front ends of the pawls and retract them from engagement with the rack 36.

To prepare the gun for operation, the pawls 38 and 40 are retracted by rotation of the handle 72 and cam pin 70, the cap 18 is removed, and a cartridge 16 is inserted in the bore of the barrel 12; and the cap 18 is then replaced to secure the cartridge in operative position. Removal and replacement of the cap 18 may be done with the needle 20 in place, and in such case the replacement of the cap 18 forces the rear end of the needle 20 through the front stopper 22 of the cartridge 16, into communication with its contents. The pawl-retracting handle 72 is now turned to its inoperative position, allowing both of the pawls 38 and 40 to engage the rack 36 on the plunger 30. The handle 52 may then be operated through one or two strokes to bring the plunger head 32 into firm engagement with the rear stopper 24 of the cartridge and to expel any air contained in the needle 20. The adjusting screw 58 is desirably adjusted to limit movement of the trigger 52 to a stroke which will move the pawl 38 a distance less than two tooth-spaces of the rack 36, so that on successive trigger strokes the pawl will pick up but one tooth of the rack at a time.

In using the gun, the trigger 52 is squeezed through a stroke to advance the plunger 30 one tooth-space. While the necessary movement of the trigger 52 can be mechanically limited to such a stroke, as by further adjustment of the screw 58, we find it preferable in practice to observe by ear and feeling when the holding pawl 40 snaps over the next successive tooth of the rack 36 and to control the trigger stroke manually in response to that observation. Successive strokes extrude successive shots of composition from the cartridge 14 through the needle, and since the successive movements of the plunger are of uniform distances, the successive shots are of uniform volume.

As the plunger approaches the limit of each successive forward movement, the holding pawl 40, lying at the forward limit of its lost-motion movement, will snap into engagement with the next successive tooth of the rack 36. Thereafter, when the trigger actuated pawl 38 is retracted by release of the trigger 52, the plunger will be held toward its advance position by the holding pawl 40. This holding will not be positive, however, for the holding pawl 40 reacts against the spring-pressed plunger 68 and may yieldingly retract through the limited lost-motion permitted by the elongation of the slot 67. Thus while the plunger will lie in advanced position at the end of each stroke, it will be permitted to retract a limited amount, as against the relatively light opposing force of the spring-pressed plunger 68, and such retraction will release the extrusion pressure. In the absence of such extrusion pressure on the extrudable composition, its flow will cease, and no bleeding or oozing of composition from the needle will occur between strokes of the trigger.

We claim as our invention:

1. A dispensing gun comprising a cartridge-receiving barrel, a plunger adapted to be advanced in a cartridge received in said barrel, intermittently operable trigger-actuated mechanism to impose dispensing force on said plunger to advance it in said cartridge, plunger-holding means having limited lost-motion retraction movement, said retraction movement being opposed by less force than that imposed on the plunger by said trigger-actuated mechanism.

2. A dispensing gun comprising a barrel adapted to receive a cartridge, a plunger adapted to be advanced in a cartridge received in said barrel, a rack on said plunger, a pair of pawls in engagement with said rack, a trigger lever connected to one of said pawls for advancing the plunger in a step-by-step movement, the second pawl being yieldingly urged into engagement with the rack and being mounted for limited lost-motion retraction movement.

3. A dispensing gun comprising a barrel adapted to receive a cartridge, a plunger adapted to be advanced in a cartridge received in said barrel, a pair of pawls lying side-by-side in engagement with said plunger, a manually operable trigger operatively connected to one of said pawls, said other pawl being a holding pawl, and a cam overlying said side-by-side pawls and manually operable to retract said pawls from operative engagement with said plunger to permit its retraction by insertion of a replacement cartridge.

4. In a dispensing device, a frame, a plunger adapted to be intermittently advanced through dispensing movement, spaced teeth on the plunger, a plunger-driving pawl biased into engagement with said teeth, an operating member operatively connected to move said plunger-driving pawl through driving and return strokes, a plunger-holding pawl biased into engagement with said teeth, said holding pawl being mounted for limited lost-motion movement permitting a retraction movement of said plunger of less than the return stroke of the plunger-driving pawl.

5. In a dispensing device, a frame, a plunger, means to advance said plunger through successive dispensing movements, spaced teeth on the plunger, a plunger-holding pawl operatively engaging said teeth, said pawl being connected to said frame through a lost motion connection, and means to cause said pawl to move to its foremost position as said plunger is advanced.

6. A multiple-shot injection gun for successively administering injection doses from a multiple-dose cylindrical cartridge, comprising a holder to receive a cartridge, an injection tube for connection to one end of the cartridge, a plunger movable into the cartridge to dispense the contents thereof through the injection tube, ratchet teeth carried with the plunger, a pawl engaging said teeth, a manually operable lever in driving relation with the pawl and fulcrumed to provide high mechanical advantage whereby manual operation of the lever exerts a strong dispensing force on the plunger, a holding pawl operatively engaging said teeth, a lost-motion support for the holding pawl, said pawl being movable with the plunger to the foremost position of lost motion of the pawl, whereby at the end of a dispensing stroke of said plunger under the strong force of said lever, said holding pawl will engage said teeth in said foremost position and will permit limited reverse movement of the plunger.

7. A multiple-shot injection gun for successively administering injection doses from a multiple-dose cartridge, comprising a holder to receive the cartridge, an injection tube for connection to the cartridge, a plunger to dispense the contents of the cartridge, a manual operating member operatively connected to drive the dispensing plunger in successive forward steps with a strong force, plunger-holding means to engage the plunger in advance position at the ends of the forward steps thereof, said holding means having limited retraction movement, and means opposing said retraction movement with a relatively light force.

8. A multiple-shot injection gun for successively administering injection doses from a multiple-dose cylindrical cartridge of viscous material, comprising a pistol-like body having a downwardly extending grip and having a forwardly projecting barrel to receive a cartridge, a dispensing tube at the forward end of the barrel to communicate with a cartridge therein, a plunger movable longitudinally of the barrel and into a cartridge contained therein to dispense the contents thereof through the dispensing tube, closely spaced ratchet teeth on said plunger, a pawl below said plunger in engagement with said teeth, a lever pivoted in said body and having a short lever arm operatively connected to said pawl and a long lever arm extending downward into position to be manually squeezed toward said grip, whereby manual squeezing force on said long lever arm is transmitted with high mechanical advantage directly to said plunger through said pawl.

9. A multiple-shot injection gun as defined in claim 8 with the addition of a holding pawl engaging the plunger teeth and mounted for limited retraction movement, said holding pawl being movable to its foremost position as said plunger is advanced.

10. A multiple-shot injection gun for rapidly administering a succession of injection doses from stoppered cylindrical cartridges, comprising a pistol-like body having a downwardly extending grip and having a forwardly extending open barrel to slidably receive a stoppered cylindrical cartridge, an axially removable cap on the front of the barrel, a double-ended needle carried by the cap the rear end of which penetrates and frictionally engages in the forward stopper of a cartridge received in the barrel, a plunger movable into the barrel to engage the rear stopper of a cartridge therein, ratchet teeth on the plunger, a driving pawl engaging the teeth, a lever connected to the driving pawl and manually movable to advance the plunger in the barrel, a holding pawl engaging the teeth, means to retract said pawls, and a handle adjacent the upper end of said grip to actuate said pawl retracting means.

FRANK C. MOORE.
WILLIAM EARL MATTOX.

REFERENCES CITED

The following references are of record in the file of this patent:

UNITED STATES PATENTS

| Number | Name | Date |
|---|---|---|
| 1,250,965 | Capwell | Dec. 25, 1917 |
| 1,694,767 | Cook | Dec. 11, 1928 |
| 1,718,596 | Smith | June 25, 1929 |
| 2,221,739 | Reiter | Nov. 12, 1940 |
| 2,316,095 | Mead | Apr. 6, 1943 |

FOREIGN PATENTS

| Number | Country | Date |
|---|---|---|
| 16,506 | Great Britain | Aug. 5, 1908 |

OTHER REFERENCES

"Patentes y Marcas", Argentine Republic, November 1940. Pages 687-688. (Copy in Div. 55.)